2 Sheets—Sheet 1.
W. N. WHITELEY.
Harvester Rake.
No. 74,464.
Patented Feb. 11, 1868.
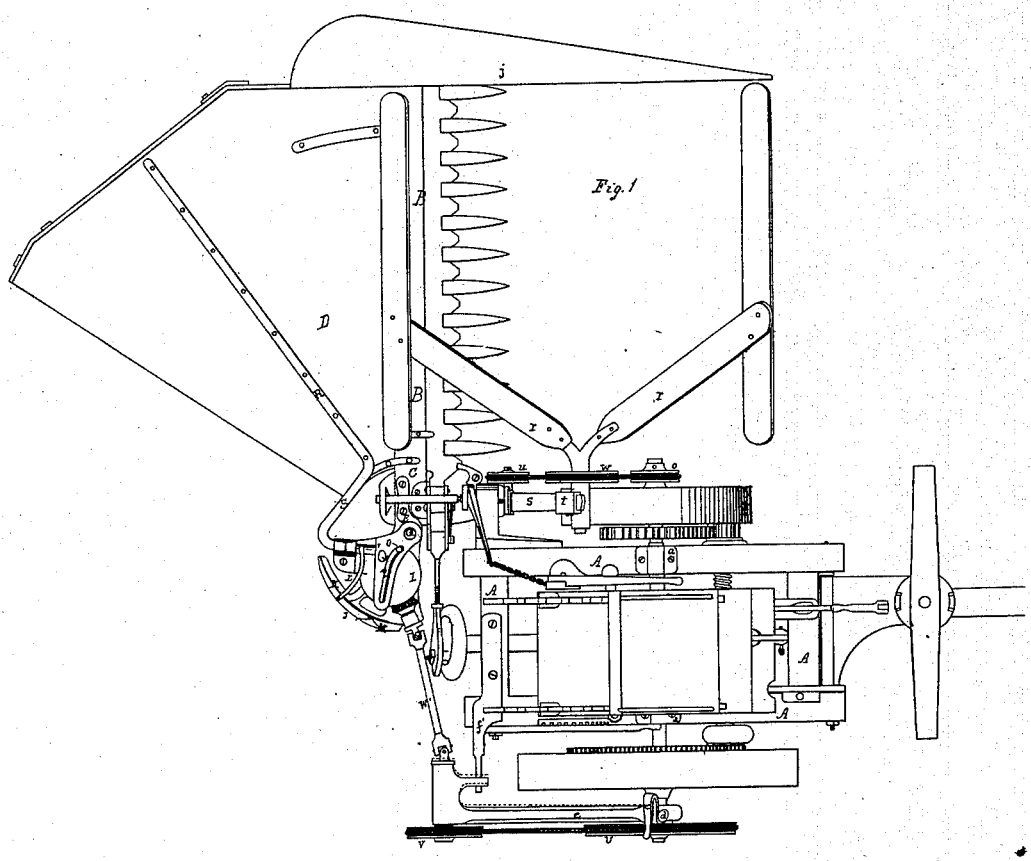
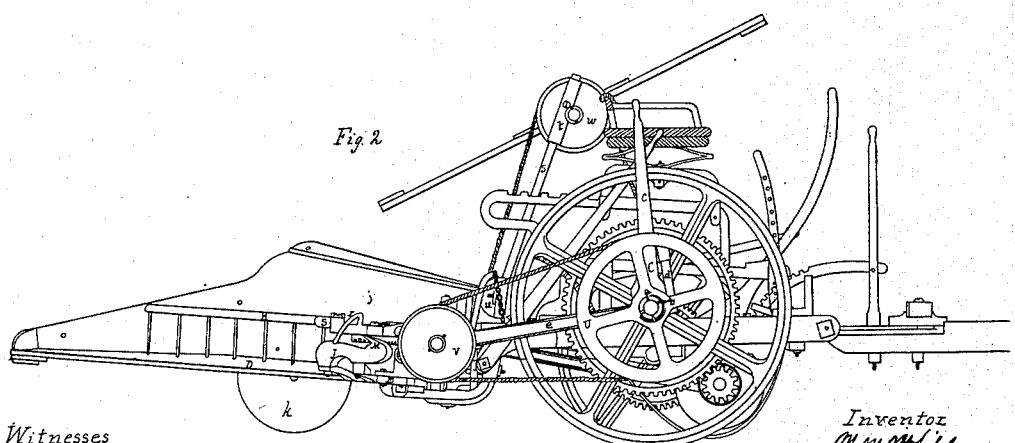
Witnesses
Inventor

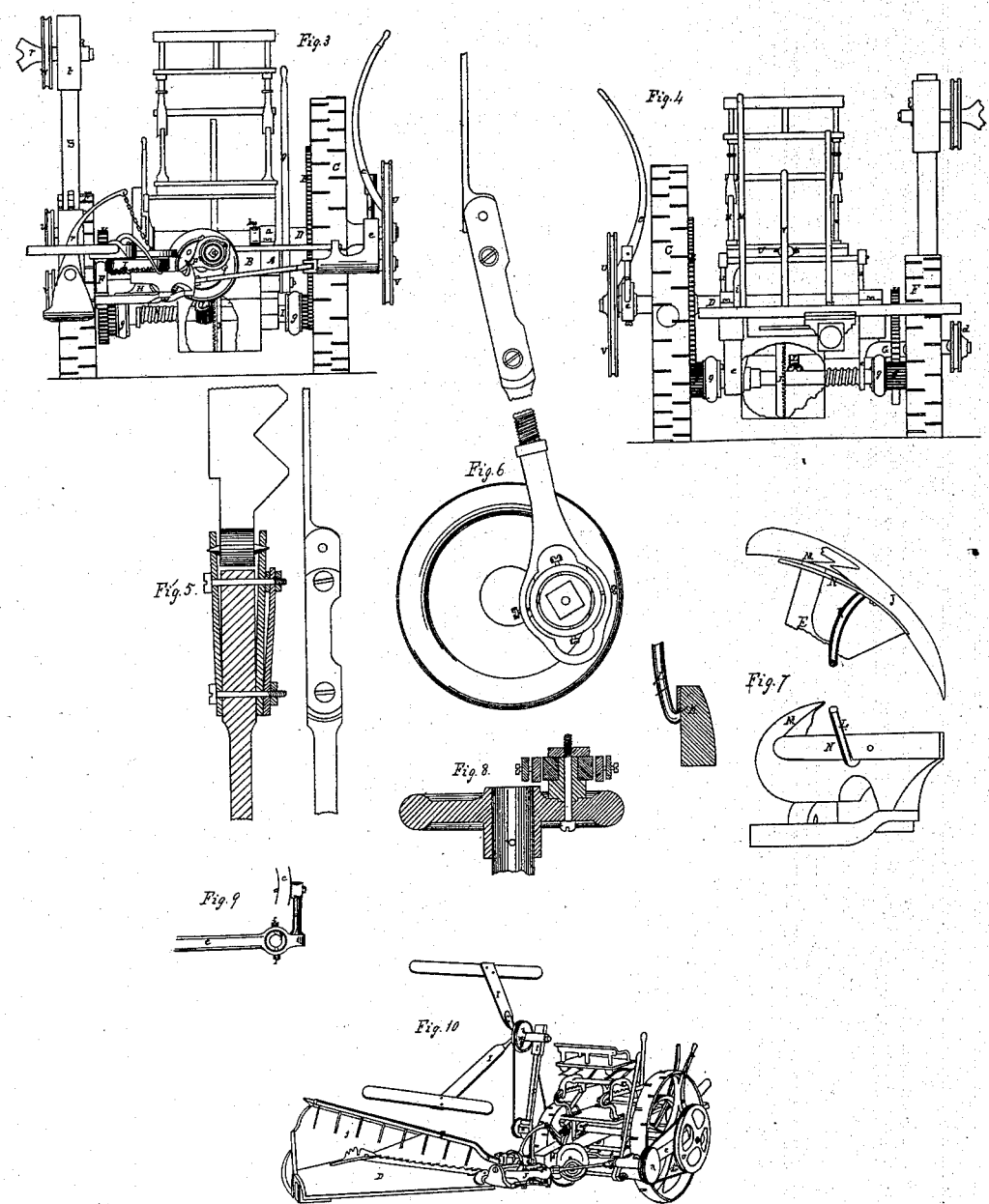

United States Patent Office.

WILLIAM N WHITELEY, OF SPRINGFIELD, OHIO.

Letters Patent No. 74,464, dated February 11, 1868.

IMPROVEMENT IN HARVESTER-RAKES.

The Schedule referred to in these Letters Patent and making part of the same.

TO ALL WHOM IT MAY CONCERN:

Be it known that I, WILLIAM N. WHITELEY, of Springfield, in the county of Clark, and State of Ohio, have invented a new and useful Improvement in Harvesters; and I do hereby declare the following to be a full, clear, and exact description of the same, reference being had to the accompanying drawings, in which—

Figure 1 represents a plan view of my machine when used as a combined reaper and raker.

Figure 2 shows a side elevation of the same.

Figure 3, a rear elevation of the same.

Figure 4, a front elevation of the same.

Figure 5, a section and side view of pitman-connection with the cutter-bar.

Figures 6 and 8, a section and side view of pitman-connection with crank-wheel.

Figure 7, a plan, elevation, and section of guiding-apparatus of the automatic rake.

Figure 9 the manner of attaching the coupling-arm to the main axle of the machine, and Figure 10 a perspective view of the machine.

This invention relates to an automatic sweep-rake, the method of operating the same from the outer side of the driving-wheel, which is at the side of the machine away from the standing grain; and it consists, first, in the manner of mounting and attaching the rake to the finger-bar, so that it will partake of all of the movements of the cutting-apparatus; second, the arrangement of the gearing, &c., by which the rake is driven and controlled; third, the manner of transmitting motion from the main driver to the rake; fourth, in the arrangement by which the transmission of motion will be uninterrupted by a change of distance between the rake and its main driver; fifth, in the arrangement by which the raking-mechanism may be readily detached and removed from the machine without disturbing the other parts of its mechanism.

The advantages of my invention are a very short sweep of the rake, so that a short platform may be used. The rake strikes into the cut grain upon the platform with sudden drop, falling on a line parallel with the front edge of the finger-bar. The whole raking-attachment may be removed from the machine by the withdrawal of two screws and a pin, and the rake may be interrupted in its movement when the grain is too thin to make a gavel at each regular sweep of the rake; and the rake is driven by mechanism situated at that side of the machine which is away from the standing crop, and it is therefore possible to drive nearer to the standing grain, and thus reduce side draught.

The rake and its actuating and guiding-devices are applicable to any harvesting-machine having a platform from which the grain may be delivered at the side, and the devices for transmitting motion from the main driver to the rake are applicable to any harvesting-machine having two supporting-wheels and a jointed cutting-apparatus.

In order that others may understand the construction and operation of my invention, I will proceed to particularly describe it.

A is the main frame, which bears the gearing, and is mounted upon the wheels by which the machine is supported and the mechanism operated. B is the cutting-apparatus attached to the rear inner side of the main frame. C is the finger-bar, and D is the platform upon which the grain falls as it is cut, and from which it is swept in the arc of a circle by the sweep-rake.

The plate E is attached to the inner end of the finger-bar C by a suitable number of screws to hold it securely in place. This plate projects about in line with the finger-bar, and upon the same level. A post or stud, fig. 3, is rigidly secured to the plate E, just at the end of the finger-bar, and the upper end of this post forms the centre or pivot G, upon which the rake moves in its reciprocation. At a little distance from the post F is a hub, H, upon the upper surface of the plate E, and said hub forms the centre of the gear-wheel I, which actuates the rake, and around the outer end of the plate E is the guide-frame J, secured by screws or other suitable devices. This guide-frame is curved about the centre, G, and it has upon its inner face a ledge, K, beneath which the hooked end of the arm L catches at certain times to hold the rake up off from the platform during its return to the front thereof. The guide-frame J has at its forward end a projecting portion, M, the lower edge of which forms an inclined guide, with which the hooked end of the arm L engages as the rake moves backward. After engaging with this inclined guide the further backward movement of the rake causes the engaging end of the arm L to descend along said guide-way until it reaches the level of the ledge K, which, at this point, meets the descending guide, and is united with it by means of a spring-latch, N, so that, as the rake swings upon the pivot G in moving backward, the free end of the arm L engages with the inclined guide at the lower side of M, and, as the rake continues to move backward, the end of said arm descends along said guide, and the rake-head is raised up from the platform. As the rake commences to move forward again, the hook end of the arm L engages with the lower edge of the spring-latch N, and traverses along that edge, and under the ledge K, to the rear end of the guide-frame, when the rake drops upon the platform and commences another backward stroke.

Motion is communicated to the rake from the driver I, by means of a pin, O, set in the upper surface of said driver, and working in a slot, P, cut in the block Q, in which are the bearings of the rake-head. The block Q is centred upon the pivot G at the top of the post F, and, as the driver I revolves about its axis, carrying the pin O with it in its revolution, the block Q, will be caused to swing back and forth upon its centre, G, and the rake will partake of these oscillations, and be carried backward and forward over the platform, sweeping the grain therefrom at every backward movement.

The rake-head R is provided with a crooked shank or arm, S, at its inner end, and said arm is curved, so as to approach the block Q at an angle of about forty-five (45°) degrees to the line of the rake-head, which line, if prolonged beyond the inner end of the rake-head, would pass through its centre of oscillation G. That part of the arm S which lies upon the block Q is made cylindrical, and it is confined in corresponding bearings by suitable caps or boxes T. By constructing the rake with the arms S bent and mounted in the manner described, the depression of the free end of the arm L, (which is secured to the arm S, near to its point of bearing in the boxes T,) will cause the rake-head to be raised up, and such depression of the arm L takes place whenever its free end engages with the guide K. The relative positions of the rake-head R and its bearings in the boxes T T, permit the rake to be raised from the platform without having its teeth brought to a horizontal position, which is objectionable, because they are then necessarily presented in that position to the falling grain when the rake is moving forward, and more or less entanglement will result when the rake falls upon the platform. It is therefore important that the rake-head should present a smooth and continuous surface to the falling grain as it moves forward, because a greater or less quantity will necessarily be cut after the rake has dropped upon the platform, and before it has moved backward beyond the reach of the falling grain. It is necessary that no grain which falls upon the rake should be dragged back with it, but only that which is beneath the rake.

Power is transmitted from the main driving-wheel, at that side of the machine which is away from the standing grain, by means of the pulleys U and V, and the shaft W', at the end of which is the bevel-pinion Y, which meshes with the driver I.

The driving-pulley U is mounted upon the end of the main shaft outside of the main driving-wheel. It is retained in place by the linchpin $a$, which also serves as a clutch-pin, suitable notches, $b$, being made in the end of the hub for that purpose, and the clutch-lever $c$ convenient to the driver's hand to throw the pulley U into or out of gear. The clutch-lever $c$ is pivoted to the post $d$, which is secured to the coupling-arm $e$, near its forward end, for that purpose. The coupling-arm $e$ is mounted upon the main axle by slipping the pivoted ring $y$ thereon, and retaining it in position by some suitable device. The ring $y$, which forms the bearing between the coupling-arm $e$ and the main axle, is hung on the vertical pivot-screws $f$, and it permits the rear end of the coupling-arm to move laterally a short distance, as it must do to permit the outer end of the platform to rise and fall with the undulations of the ground, because said movements of the cutting-apparatus take place upon a horizontal axis, and the rake partakes of them. The frame upon which the rake is mounted projects horizontally from said axis toward the pulley V, with which the driver I is connected by the shaft W'. If, therefore, the pulley V were not permitted to move laterally, it would be necessary to provide some connection capable of varying its length, because the distance between the driver I and pulley V constantly changes with every rise or fall of the outer end of the platform. To permit these necessary adjustments to take place automatically, so that the apparatus may be self-regulating, I attach the rear end of the coupling-arm to the rear of the frame by a loose sliding connection, formed by making a hole through a portion of the coupling-arm, and passing the end of the arm $f'$ through it. This arm is rigidly secured to the rear of the main frame, and projects horizontally therefrom, as shown in fig. 1. By these means the rear end of the coupling-arm is maintained at its proper height, and permitted to move laterally far enough to preserve its uniform and proper distance from the driver I.

The frame upon which the rake is mounted and moves being capable of rising and falling in a vertical arc, and the pulley V being capable of motion only in a horizontal direction, it follows that their relative positions may be much changed without any change in linear distance from each other, and it therefore follows that a rigid shaft to communicate motion would not operate without continual cramping. I therefore make the shaft W' flexible by placing a universal joint-coupling at each of its ends, as seen in fig. 1, and this permits the operation of the prime mover and the rake to be continuous and undisturbed by any changes of relative position of the driver I and pulley V which may occur.

When the machine is to be used as a mower, the platform, divider, raking-mechanism, &c., are removed from the finger-bar, which may then be permitted to slide on the ground. The removal of the rake is accomplished by removing the screws which secure the plate E to the inner end of the finger-bar; and by removing the linchpin $a$, which retains the pulley U, and another, not shown in drawings in this division, which retains the coupling-arm $e$ upon the main axle, the whole raking-mechanism may be removed from the machine.

The reel $r$ is mounted upon the reel-post $s$ by the use of a sliding head, $t$, which bears the journal or shank of the reel-head, and it is secured at any desired point on the reel-post by a set-screw, as shown. The reel-post *s* is curved at its lower end, so as to conform to the lower surface of the front end of the inner shoe, and it is secured to said shoe by screw-bolts so disposed as to hold said part securely, and yet be ready of access and of easy removal. Near the base of the reel-post is an adjustable pulley, *u*, which may be secured at the desired point upon the reel-post by a set-screw, or other convenient device. I operate this reel by means of a pulley, *v*, located on the axle of the inner driving-wheel, and the belt from this pulley passes around the outer sides of the driving-pulley *v*, the reel-pulley *w*, and the adjustable pulley *u*, which serves as a tightening and a leading-pulley. The pulleys thus situated represent the points of a triangle, of nearly equal sides; and, with this arrangement, variations of position between the reel-pulley and its driver will not materially affect the operation of the reel, and extra leading-pulleys will not be required.

Having thus described my invention, what I claim as new, and desire to secure by Letters Patent of the United States, is—

1. The rake-head R, provided with the arm S, curved as described, and mounted in bearings on the swinging block Q, and the pivot-post F, all constructed and combined as set forth and described.

2. The combination of the rocking rake-head R, swinging block Q, moving upon the pivot G, gearing I Y, shafting W', and pulleys V and U, all arranged on a two-wheeled jointed-bar machine, so as to move in unison with the cutter-bar and platform, as set forth.

3. The combination, in a single-jointed harvesting-machine, of the cutting-apparatus, the reciprocating sweep-rake R, and the overhung horizontal reel *r*, when said rake and reel are both mounted upon the inner shoe of said cutting-apparatus, and constructed and operated in the manner shown and described.

4. The rake-head R, with the arm S, curved in the form shown and described, in combination with the stud O on the gear-wheel I, and block Q, provided with the slot P, to give a vibrating motion to said block Q and rake R, as set forth and described.

5. The tumbling-shaft W', in combination with the vibrating coupling-arm *e*, as and for the purpose set forth.

6. The swinging block Q, constructed with horizontal bearings for the rake R, a slot, P, for the actuating-stud O, and pivoted upon a vertical axis, G, all as set forth and described.

7. The arrangement of the arm S, arm L, block Q, and guide-frame J, all constructed as described, and for the purpose set forth.

8. The coupling-arm *e*, mounted upon the outer end of the main axle by means of the gimbal-ring *y*, and attached to the rear of the main frame by means of the arm *f*, as and for the purpose set forth.

9. The combination and arrangement of the plate E, pivot-post F, gear-wheel I, block Q, guide-frame J, and pinion Y, when constructed as and for the purpose set forth.

10. The arrangement of the driving-pulley *v*, the reel-pulley *n*, and tightening or guide-pulley *u*, so that the reel-belt will form a triangle in passing around said pulleys, as and for the purpose set forth.

WILLIAM N. WHITELEY.

Witnesses:
 CHARLES EVANS,
 THOS. J. PRINGLE.